United States Patent
Adams et al.

(10) Patent No.: US 6,865,616 B1
(45) Date of Patent: Mar. 8, 2005

(54) FLEXIBLE MEDIA ACCESS CONTROL AND SECTION FILTER HARDWARE ENGINE FOR SATELLITE DATA RECEIVER

(75) Inventors: Thomas G. Adams, Longmont, CO (US); Randy R. Fuller, Longmont, CO (US)

(73) Assignee: Broadlogic Network Technologies, Inc., Milpitas, CA (US)

(*) Notice: Subject to any disclaimer, the term of this patent is extended or adjusted under 35 U.S.C. 154(b) by 873 days.

(21) Appl. No.: 09/649,792

(22) Filed: Aug. 29, 2000

Related U.S. Application Data

(60) Provisional application No. 60/152,190, filed on Sep. 2, 1999.

(51) Int. Cl.[7] .............................................. G08F 15/16
(52) U.S. Cl. ...................... 709/250; 709/231; 709/245
(58) Field of Search ......................... 714/3; 370/392, 370/393, 536, 542; 709/250, 216, 231, 245; 455/3.02; 725/63, 68

(56) References Cited

U.S. PATENT DOCUMENTS

| | | | |
|---|---|---|---|
| 5,559,999 A | 9/1996 | Maturi et al. ............... 395/550 |
| 5,650,825 A | 7/1997 | Naimpally et al. .......... 348/465 |
| 5,659,615 A | 8/1997 | Dillon ......................... 380/21 |
| 5,881,245 A | 3/1999 | Thompson ............. 395/200.49 |
| 5,931,968 A | * 8/1999 | Gray ........................... 714/806 |
| 5,959,659 A | 9/1999 | Dokic ........................... 348/7 |
| 5,960,006 A | 9/1999 | Maturi et al. ................ 370/509 |
| 6,188,684 B1 | * 2/2001 | Setoyama et al. ........... 370/352 |
| 6,256,307 B1 | * 7/2001 | Salmonson .................. 370/392 |
| 6,400,715 B1 | * 6/2002 | Beaudoin et al. ............ 370/392 |
| 6,490,632 B1 | * 12/2002 | Vepa et al. .................. 709/250 |
| 6,584,096 B1 | * 6/2003 | Allan ........................... 370/352 |
| 6,618,398 B1 | * 9/2003 | Marchetti et al. ............ 370/475 |

FOREIGN PATENT DOCUMENTS

JP       2000151695 A   *   5/2000    ........... H01L/12/56

* cited by examiner

Primary Examiner—Jason D. Cardone
Assistant Examiner—Douglas Blair
(74) Attorney, Agent, or Firm—Townsend and Townsend and Crew LLP

(57) ABSTRACT

A method and system are provided for processing a data transport stream. The transport stream is parsed to derive multiple elementary substreams, each of which includes a received media access control address. The received media access control address is then compared in hardware against several stored media access control addresses.

18 Claims, 2 Drawing Sheets

FLEXIBLE MEDIA ACCESS CONTROL AND SECTION FILTER HARDWARE ENGINE FOR SATELLITE DATA RECEIVER

This application claims the priority of U.S. Prov. Pat. Appl. No. 60/152,190, filed Sep. 2, 1999, which is herein incorporated by reference for all purposes.

BACKGROUND OF THE INVENTION

The Digital Video Broadcast (DVB) standards and the Digital Satellite System (DSS) standards are designed for the delivery of digital video and digital audio "programs" to in-home set-top box appliances. More recently, interest has arisen in using these standards for high bandwidth data delivery, for example, to personal computers for applications such as Internet access. The data broadcast may include, for example, internet protocol (IP) packets carrying electronic mail, world wide web content, and other data.

In data broadcast systems, various elementary streams of digital video, digital audio, and digital data typically are time-division multiplexed onto a single transport stream that is broadcast by way of a satellite transponder to multiple receivers. The elementary streams of information or data are generally packetized, as is the transport stream.

A receiver, for example, may be coupled to a personal computer. Such a receiver would receive the transport stream comprising the information, demultiplex elementary streams of digital video, digital audio, and/or data from the transport stream, and filter (select) those elementary streams destined for that receiver. The receiver further should be able to deliver the elementary streams to host memory of the personal computer for processing or display.

Packets containing the elementary stream data may be addressed either to a single receiver, referred to as pointcasting, or to a group of receivers, referred to as multicasting. The address information is generally contained in a field of the header of each packet. The field containing the address information may be referred to as a media access control (MAC) field. The MAC field allows a receiver to store or process only the packets destined for that receiver.

Designing a receiver capable of demultiplexing, filtering, and delivering the elementary streams of information poses difficult problems and challenges. For example, critical timing constraints govern the delivery of elementary streams containing digital video and digital audio programs. These critical timing constraints derive, for example, from the specific timing required for proper decoding and presentation of digital video frames on the host computer. Hence, the particular elementary streams must be demultiplexed, filtered, and delivered in real time in such a way that these critical timing constraints are met.

SUMMARY OF THE INVENTION

Embodiments of the invention relate to the application of a hierarchical scheme in which a data transport stream is organized with encapsulations at multiple levels. For example, with a two-level hierarchy, the transport stream is made up of data streams identified by program identifiers, each of which is itself made up of elementary substream components identified by MAC field. Such an organization permits selective retrieval of the individual substream components as needed. In particular embodiments, such selectivity allows the scheme to be used to filter unwanted substream components out of the individual data streams as they are delivered to an end user system.

Accordingly, in one embodiment, a method is provided for processing a transport stream. In accordance with the method, the transport stream is parsed to derive multiple elementary substreams, each of which includes a received MAC address. The received MAC address is compared in hardware against several stored MAC addresses. In another embodiment, the transport stream is additionally parsed to derive multiple data streams that include associated program identifiers, with each data stream being associated with a plurality of the multiple elementary substreams. The associated program identifiers and MAC addresses are used to determine corresponding transfer locations in host memory, and direct memory access transfers of the data is performed to the corresponding transfer locations.

To facilitate the comparison of the received MAC address with the stored MAC addresses, each of the stored MAC addresses is concatenated with an index and a disable bit in one embodiment. When the disable bit is inactivated, a plurality of the bits of the received MAC address is masked. The unmasked bits are iteratively compared iteratively with similarly unmasked bits of each of the stored MAC addresses until a match is found.

Embodiments of the invention are preferably configured to transfer the data to an end user system. In one such embodiment, the end user system is an audio-visual system while in another such embodiment, the end user system is a networked computer system. In a preferred embodiment, the networked computer system includes a world wide web browser.

A further understanding of the nature and advantages of the present invention may be realized by reference to the remaining portions of the specification and the drawings.

DESCRIPTION OF THE SPECIFIC EMBODIMENTS

1. Introduction

Figure 1:
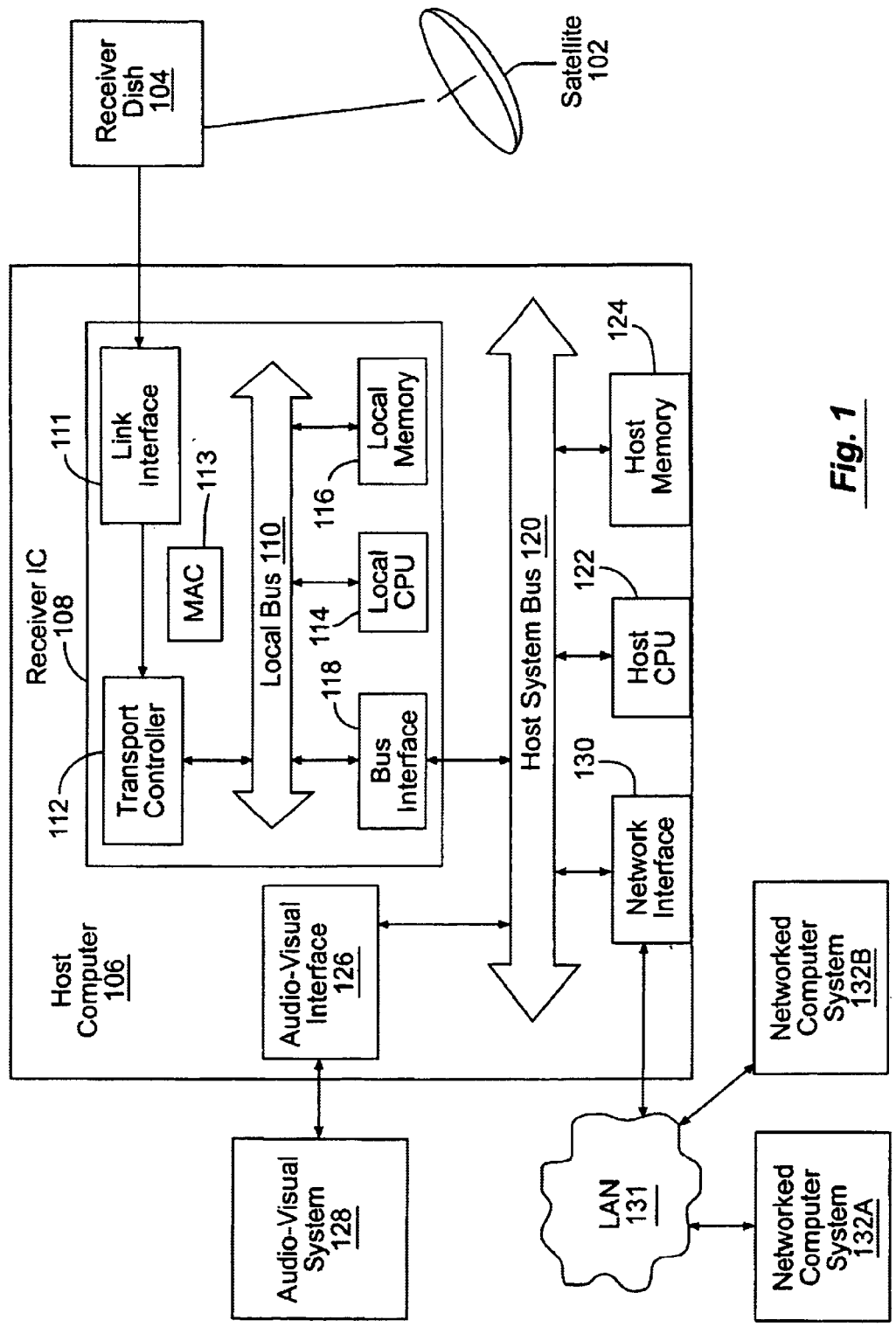
FIG. 1 is a schematic diagram including a system in accordance with one embodiment of the present invention.

FIG. 1 is a schematic diagram including a system in accordance with an embodiment of the present invention. A satellite transponder 102 transmits a signal carrying a transport stream to multiple receiver dishes 104, one of which is shown in the figure. Receiver dish 104 in FIG. 1 is coupled to a host computer system 106 by way of a link interface 111 on a receiver circuit 108. Receiver circuit 108 may comprise an integrated circuit, a circuit board having the different receiver components attached thereto, or any other suitable circuit design or configuration.

Receiver circuit 108 includes a local bus 110 to which is coupled a transport controller 112, MAC comparison engine 113, a local CPU 114, and local memory 116. Transport controller 112 receives the transport stream from link interface 111 and handles low-level transport stream parsing. In one embodiment, transport controller 112 operates in conjunction with a hardware MAC comparison engine 113. In accordance with one embodiment of the present invention, MAC comparison engine 113 is a stand-alone component with its own connection to local bus 110. Alternatively, MAC comparison engine 113 may be incorporated with transport controller 112 or some other component in receiver circuit 108. Both MAC comparison engine 113 and transport controller 112 are controlled by local CPU 114. Local CPU 114 comprises a microcontroller that controls operations on the receiver circuit 108. Local memory 116 comprises memory such as static RAM, dynamic RAM, or ROM located on receiver circuit 108.

A bus interface 118 couples local bus 110 on receiver circuit 108 to a host system bus 120 of host computer 106. In a preferred embodiment, host system bus 120 comprises a PCI bus, and bus interface 118 comprises a PCI interface. Also coupled to host system bus 120 are a host CPU 122, host memory 124, an audio-visual interface 126, and a network interface 130, among other components. Host CPU 122 comprises the microprocessor of host computer 106, and host memory 124 comprises memory of host computer 106. Audio-visual interface 126 comprises a graphics interface that is coupled to an audio-visual system 128. Audio-visual system 128 may include, for example, speakers, and a CRT monitor or a flat panel display. Network interface 130 comprises a network interface card that is coupled to a local area network (LAN) 131, which is in turn coupled to one or more networked computer systems 132. For example, network interface 130 may comprise an Ethernet card, LAN 131 may comprise an Ethernet network, and networked computer systems 132 may comprise personal computers.

There are two principal functions performed by MAC comparison engine 113, implementation of a submultiplexing scheme and a filter function. Conceptually, the transport stream may be viewed as including a hierarchy of encapsulations. At the top level of the hierarchy, the transport stream comprises a plurality of elementary streams identified by program identifiers. Such a scheme is described in the concurrently filed and commonly assigned application entitled "MULTITHREADED DIRECT MEMORY ACCESS ENGINE FOR BROADCAST DATA DEMULTIPLEX OPERATIONS," having Thomas G. Adams and Gene Maine as coinventors, which is herein incorporated by reference for all purposes. Within each such elementary stream are components identified by MAC field. Where the transport stream contains broadcast data, the elementary streams identified by program identifiers may be associated with channels and the components identified by MAC field may be associated with pieces of the channel. In general, only certain pieces of the channel are of interest to networked computer systems 132, so MAC comparison engine 113 also performs the function of filtering out unwanted components of the elementary streams according to the MAC field.

Embodiments of the invention may also be complemented with timestamping aspects as described in the concurrently filed and commonly assigned application, "SYSTEM TIME CLOCK CAPTURE FOR COMPUTER SATELLITE RECEIVER," having Thomas G. Adams and Randy R. Fuller as coinventors, which is also herein incorporated by reference for all purposes.

2. Submultiplexing Scheme

In implementing a submultiplexing scheme for a transport stream, program identifiers are included at a higher hierarchical level and MAC addresses are included at a lower hierarchical level. The transport stream can be parsed at the higher hierarchical level to derive multiple elementary streams that include the associated program identifiers. Additionally, the transport stream can be parsed at the lower hierarchical level to derive multiple elementary substreams, each including a received MAC address. The MAC address for each such elementary substream is compared in hardware against a plurality of stored MAC addresses to identify the elementary substream.

Figure 2:
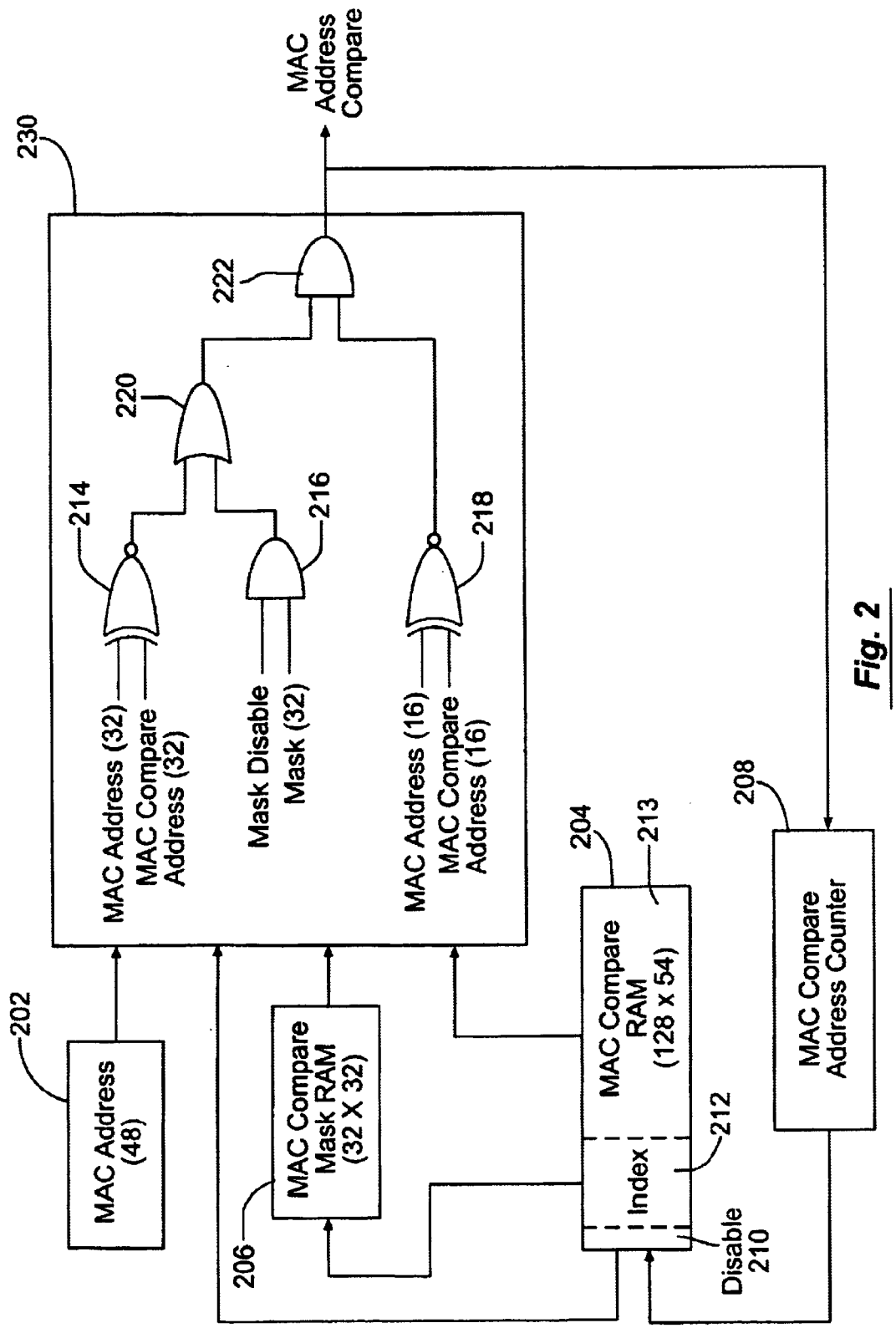
FIG. 2 is a schematic diagram illustrating an embodiment in which a received media access control address is compared with stored media access control addresses.

The MAC address compare function is illustrated for one embodiment in FIG. 2. In describing the MAC address compare function, reference is made to the bit length of certain components of addresses as they are used in one embodiment of the invention. It readily will be appreciated, however, that the invention may also be applied to addresses with components of different bit lengths. In FIG. 2, received MAC address 202 is identified by comparing it with MAC addresses stored in MAC compare RAM 204. In the illustrated embodiment, received MAC address 202 contains 48 bits. Accordingly, each of the comparison MAC addresses stored in MAC compare RAM 204 contains a 48-bit component 213 that corresponds to the possible addresses to be identified. Concatenated to each of the comparison address components 213 is a five-bit index 212 and a disable bit 210.

In accordance with one embodiment, up to 128 different stored comparison MAC addresses 204 are supported for comparison with each received MAC address 202. In addition, each of the 128 stored comparison MAC addresses 204 can have any one of 32 independent compare masks (stored in the MAC compare mask RAM 206) assigned to it. This provides great flexibility in the filtering and selection of packets and allows faster identification of received MAC address 202 by speeding up the comparison process. As discussed in detail below, each of the associated compare masks allows suppression of 32 of the 48 MAC address bits from the comparison. In addition, under appropriate circumstances, disable bit 210 may be activated to suppress the masking function, thereby forcing a comparison of the full 48-bit MAC address with the comparison MAC addresses.

Using the bit masks to ignore portions of the MAC address field during the comparison also allows multicasting to groups of MAC addresses. Such multicasting may comprise Internet Protocol (IP) multicasting where a single message is sent to a group of IP addresses. The capability for such multicasting allows host computer 106 to be used as a communications bridge to a local area network that includes multiple networked computer systems 132.

One method by which the compare function may be implemented is shown with logic circuitry 230. Here, the 16-bit unmasked portion of received MAC address 202 is compared with the corresponding 16 bits of one of the comparison MAC address components 213 with XNOR gate 218. The mask disabling feature is implemented with AND gate 216 by comparing the disable bit 210 with each of the mask bits and is controlled with OR gate 220, which restricts the comparison of the masked bits to instances where disable bit 210 has been activated. If the mask has been disabled, a comparison is performed with XNOR gate 214 of the remaining 32 bits of received MAC address 202 with comparison MAC address component 213. This procedure proceeds iteratively through the stored MAC compare addresses 204 until a match is achieved between the masked (or unmasked) received MAC address 202 and the particular MAC compare address 204.

There are various ways to load the MAC address that is to be compared in different embodiments. In the format shown in FIG. 2, where each comparison MAC address component 213 is concatenated with an index 212 and a disable bit 210, MAC compare address 204 may be loaded in two instructions. For example, the lower bits of the address (0–31) may be loaded in a first instruction, with the disable bit, index, and higher bits (32–47) being loaded in a second instruction. Provided all the MAC compare RAM locations have their own unique address in memory, there is no order dependency for loading; this is also the case for MAC compare mask RAM 206. In one embodiment, the received MAC address 202 to be compared is loaded in two instructions, much like MAC compare address 204 or the MAC compare mask. Alternatively, individual bytes of received MAC address 202 are loaded. If a platform is used that does not support byte operations, this may be done via individual registers that represent specific bytes of received MAC address 202.

3. Filter Functions

The filter functions embodied by the invention are complementary to the functions described above. Because each channel associated with an individual program identifier may correspond to multiple individual components, each of which is identified by a MAC address, the comparison functions may also be used in different embodiments to filter out unwanted components.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for processing a transport stream, the method comprising:
   (a) parsing the transport stream to derive multiple elementary substreams, each elementary substream including a received media access control (MAC) address; and
   (b) comparing in hardware the received MAC address of a particular elementary substream against a plurality of stored MAC addresses, each stored MAC address having (i) a concatenated disable bit, and (ii) at least one independent compare mask assigned to it that masks a portion of the MAC address bits from the comparison when the disable bit is inactivated;
   (c) comparing any unmasked bits of the received MAC address against corresponding unmasked bits of the comparison MAC address;
   (d) comparing the disable bit with each of the bits in the compare mask to determine if the mask has been disabled for the remaining bits of the MAC addresses;
   (e) comparing the remaining bits of the received MAC address with the corresponding bits of the comparison MAC address when the mask has been disabled; and
   (f) repeating steps (c)–(e) for each of the received MAC addresses until a match is achieved between each received MAC address and a particular comparison MAC address.

2. The method according to claim 1, the method further comprising:
   (a) parsing the transport stream to derive multiple data streams including associated program identifiers, each such data stream being associated with a plurality of the multiple elementary substreams;
   (b) using the associated program identifiers and MAC addresses to determine corresponding transfer locations in a host memory; and
   (c) performing direct memory access transfers of the multiple data streams and multiple elementary substreams to the corresponding transfer locations in the host memory.

3. The method according to claim 2, the method further comprising transferring the multiple data streams and multiple elementary substreams to an end user system.

4. The method according to claim 3 wherein the end user system comprises an audio-visual system and the step of transferring the multiple data streams and multiple elementary substreams is performed through an audio-visual interface.

5. The method according to claim 3 wherein the end user system comprises a networked computer system and the step of transferring the multiple data streams and multiple elementary substreams is performed through a network interface.

6. The method according to claim 5 wherein the end user system further comprises a world wide web browser.

7. The method according to claim 2, the method further comprising the step of filtering out unwanted elementary substreams associated with a particular data stream.

8. The method according to claim 1 wherein the received MAC address comprises 48 bits and each of the stored MAC addresses comprises 48 bits.

9. The method according to claim 1 wherein the comparison of unmasked bits in step (d) is implemented with an XNOR gate.

10. The method according to claim 1 wherein step (d) is implemented with an AND gate by comparing the disable bit with each of the masked bits and controlled with an OR gate, which restricts the comparison of the masked bits to instances where the disable bit has been activated.

11. A system for receiving and processing a transport stream, the system comprising:
    (a) a receiver configured to derive multiple elementary substreams, each elementary substream including a received media access control (MAC) address having a concatenated disable bit;
    (b) at least one independent stored compare mask assigned to each stored MAC address that masks a portion of the MAC address bits from the comparison when the disable bit is inactivated;
    (c) a hardware comparison engine within the receiver, the hardware comparison engine being configured to:
       (i) compare any unmasked bits of the received MAC address against corresponding unmasked bits of the comparison MAC address;
       (ii) compare the disable bit with each of the bits in the compare mask to determine if the mask has been disabled for the remaining bits of the MAC addresses;
       (iii) compare the remaining bits of the received MAC address with the corresponding bits of the comparison MAC address when the mask has been disabled; and
       (iv) repeat steps (i)–(iii) for each of the received MAC addresses until a match is achieved between each received MAC address and a particular comparison MAC address.

12. The system according to claim 11, the system further comprising a direct memory access (DMA) transfer engine within the receiver, wherein the receiver is further configured to derive multiple data steams and associated program identifiers from the transport stream, each such data stream being associated with a plurality of the multiple elementary substreams, and wherein the DMA transfer engine is configure to initiate DMA transfers of the multiple data streams and multiple elementary substreams to the corresponding transfer locations in a host memory.

13. The system according to claim 12, the system further comprising an interface connected to the receiver configured to transfer the multiple data streams and multiple elementary substreams to an end user system.

14. The system according to claim 13 wherein the end user system comprises an audio-visual system and interface comprises an audio-visual interface.

15. The system according to claim 13 wherein the end user system comprises a networked computer system and the interface comprises a network interface.

16. The system according to claim 15 wherein the end user system further comprises a world wide web browser.

17. The system according to claim 11 wherein the hardware comparison engine is further configured to filter out unwanted elementary substreams associated with a particular data stream.

18. The system according to claim 11 wherein the received MAC address comprises 48 bits and each of the stored MAC addresses comprises 48 bits.

* * * * *